March 28, 1944.  A. J. VAN ALSTYNE  2,345,019
ROTATING COUPLING
Filed April 29, 1942
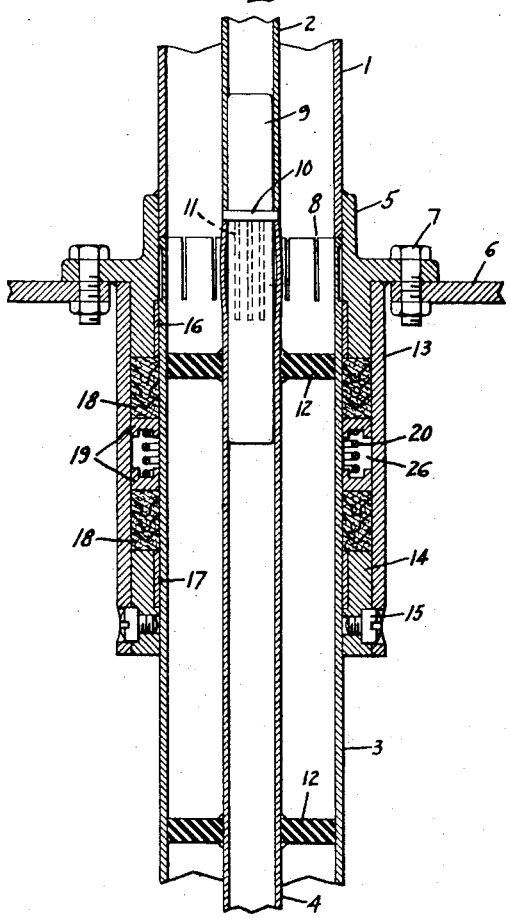
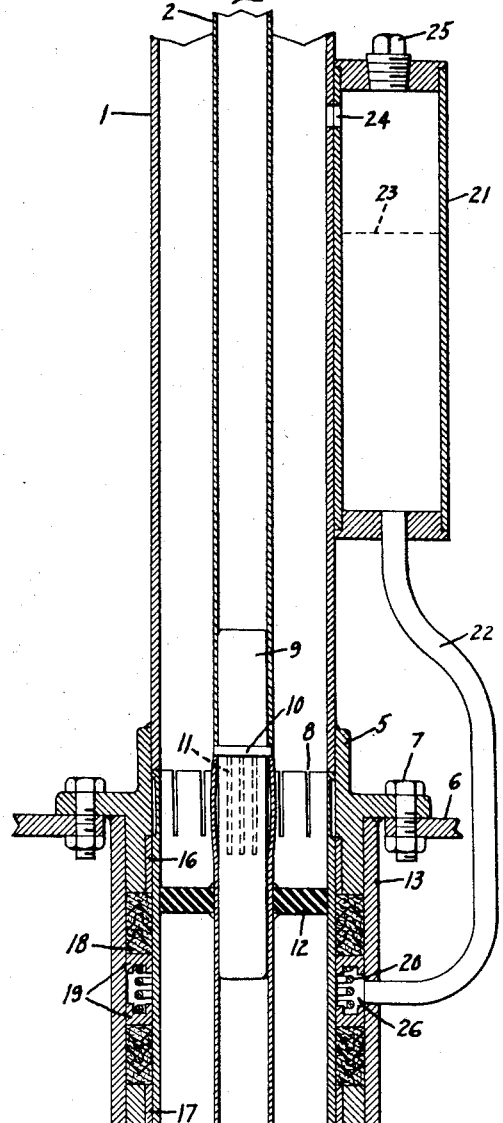
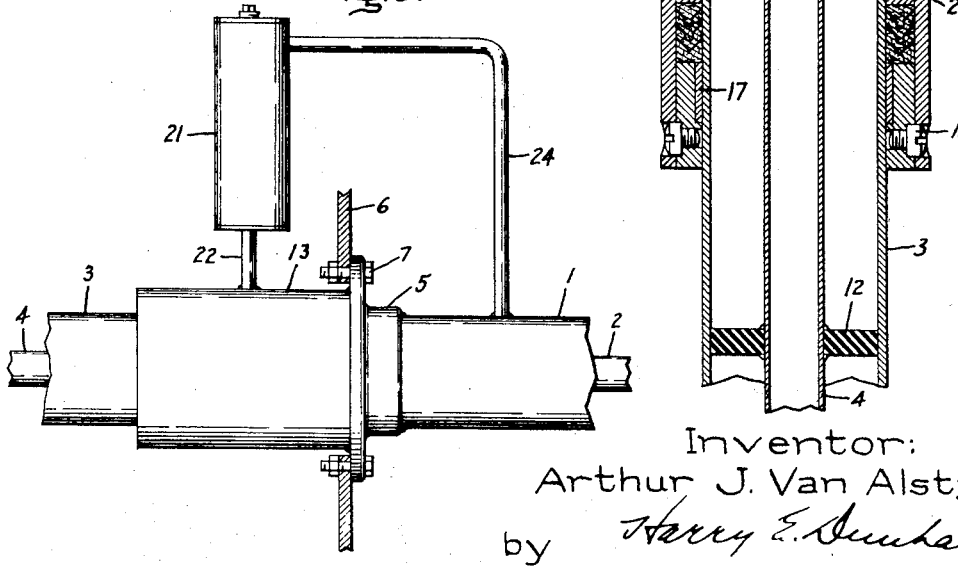
Inventor:
Arthur J. Van Alstyne,
by Harry E. Dunham
His Attorney.

Patented Mar. 28, 1944

2,345,019

UNITED STATES PATENT OFFICE 2,345,019

ROTATING COUPLING

Arthur J. Van Alstyne, Schenectady, N. Y., assignor to General Electric Company, a corporation of New York Application April 29, 1942, Serial No. 441,054

8 Claims. (Cl. 174—21)

My invention relates to gas-filled high frequency concentric transmission lines having relatively rotatable sections, and particularly to a system for sealing the junction between such sections to prevent loss of gas from the transmission line.

One of the objects of my invention is to provide a seal which maintains at the junction between relatively rotatable sections of a concentric transmission line an external pressure greater than the pressure of the gas within the line.

A further object is to provide such a seal which utilizes a fluid not only to maintain a positive pressure at the junction point but also to lubricate both the packing glands used in the seal and the bearing surfaces between the rotatable sections.

My invention is particularly adapted for use, for example, in a transmission line to which is coupled a rotatable antenna for ultra high frequency radio apparatus. For such apparatus using very high frequencies, gas-filled cables are found to give more desirable results. The coupling of a gas-filled transmission line to a rotatable antenna presents the problems of retaining the dry gas and lubricating the packing glands and bearing surfaces. In the past, grease and similar lubricants in conjunction with packing material have been used for this purpose, but because of the varying weather conditions to which such a structure is subjected have proved unsatisfactory. An object of this invention is to provide an improved seal for such a structure.

One of the important features of my invention is the subjecting of the packing glands used in the seal to a pressure in excess of that of the gas within the transmission line. By using oil or a similar fluid for this purpose, the packing material is maintained in a good condition and lubrication of bearing surfaces between the relatively rotatable parts is obtained. By connecting a column of oil to a space around the packing lines and maintaining the top of that column at the pressure of the gas within the transmission line, leakage of gas from the line through the packing glands will be prevented.

Another feature of my invention is the use in conjunction with a plurality of sets of packing glands of a compressed spring to maintain these glands under positive pressure to resist more effectively a tendency of the gas to leak past the glands.

A still further feature is the manner of constructing and assembling the inner and outer conductors of the relatively rotatable sections of the transmission line to maintain good electrical contact between these conductors.

The features of my invention which I believe to be novel are set forth with particularity in the appended claims. My invention itself, however, together with further objects and advantages thereof, may best be understood by reference to the following description taken in connection with the accompanying drawing, in which Fig. 1 is a cross section of a vertical transmission line using certain features of my invention; Fig. 2 is a cross section of a vertical line using the preferred form of my invention; and Fig. 3 shows the invention of Fig. 2 as applied to a horizontal line.

In Fig. 1 a section of a vertical concentric transmission line is shown comprising an outer conducting tube 1 and an inner centrally disposed conductor 2. To the upper section of this transmission line is joined a lower section in which 3 is a corresponding outer conducting tube having disposed within it a centrally located conductor 4. These sections are relatively rotatable and joined in the manner of my invention. Connected to the outer conducting tube 1 is a mounting flange part 5. This flange part may be welded or brazed to the outer conductor part 1 or joined in any other well-known manner. Flange part 5 in turn may be mounted in some type of a mounting plate 6 by means of bolts 7. Mounting plate 6 may be part of a rotating structure, for example, a rotating antenna structure. The upper part of conductor 3 is slotted as at 8 and the outer conductor 3 is slightly recessed in the vicinity of these slotted portions 8 to provide good electrical contact between flange 5 and conductor 3. The part 8 may be made of material having spring-like qualities, for example, beryllium copper, to insure good contact between the flange 5 and the conductor 3. Likewise, by this structure continuity of the inside surface of the outer conductors 1 and 3 is maintained.

The portion of the inner conductor 2 which connects to the rotatable antenna or other structure has inserted in it a plug, or contact making member, 9 having a shoulder portion 10. Plug 9 may have an outer diameter of the same size as the inner diameter of inner conductor 2 and be pressed into that conductor to insure a good electrical contact between these members, or may be joined in any other manner well known in the art. The lower portion of plug 9 extends into the inner conductor 4, whose upper end is slotted as at 11 to provide continuous electrical contact between this inner conductor and the lower part of plug 9. This portion of conductor 4 may be made of spring-like material, for example, beryllium copper. The inner conductors of this transmission line are fixed with respect to their respective outer conductors, being supported in this position by spaced insulators 12.

In order to provide a seal to prevent leakage of gas from the transmission line, I provide an outer shell or sleeve 13 welded or brazed to the mounting flange 5 and dispose within the lower portion of this shell an end ring 14 which engages the inner surface of the shell and the outer surface of the conductor 3. The end ring 14 is held in position with respect to sleeve 13, for example, by screws 15. Both flange part 5 and end ring 14 have bearing surfaces 16 and 17 for engaging the outer surface of conductor 3 to support any side thrust that may develop between the rotating portion of the transmission line and the fixed portion. Bearing surfaces 16 and 17 may be of the oilless type or of any other suitable type well known in the art.

By the structure above outlined, a rotatable structure is provided for the upper section of the transmission line which not only rotates freely with respect to the lower section, but insures good electrical contact between the abutting inner and outer conductors of adjacent sections. Likewise this structure is such that continuity of the inside surfaces of these respective conductors is maintained.

Disposed within the annular space, or chamber 26, formed by the outer surface of conductor 3 and the inner surface of sleeve 13 and the opposed faces of flange 5 and end ring 14 are two sets of packing glands or suitable sealing material 18. These packing glands are shown to be of the "chevron" type, but any other type well known in the art may be used. These packing glands are maintained in contact with the outer surface of conductor 3 and the inner surface of sleeve 13 and the opposed faces of flange 5 and end ring 14 by means of retainer parts 19 and spring 20. Spring 20 is maintained under compression so that a positive force is exerted upon the packing glands to prevent leakage of gas from the transmission line through the slotted portions 8 and bearing 16. In assembling, the upper section of the packing material is first inserted in the above-mentioned annular space or chamber 26. Then, in turn, are inserted a spring retainer 19, spring 20, a second retainer, the other section of the packing gland, and finally the end ring 14.

In Fig. 2 I have shown a preferred form of my seal for a gas-filled concentric line. The structure shown in Fig. 1 is subject to the disadvantage that the packing members and other sealing material, such as grease, which may be used in conjunction with the packing material, are affected by weather conditions to which the structure is subjected. Such materials harden in cold and inclement weather. The seal, consequently, may become defective and gas escape from the transmission line. In order to prevent the occurrence of such an undesired leakage of gas, I have shown in Fig. 2 a modification of this structure which provides a liquid seal under positive pressure with respect to the pressure of the gas within the transmission line. As one structure by which such a seal may be obtained, I have shown tank 21 secured to the outer conductor of the upper section as by welding, brazing, or any other well-known method. Tank 21 is connected at its lower portion by means of conduit means 22 with the annular chamber 26. Tank 21 is filled with oil or any other suitable liquid to a level 23, thus creating a column of oil to maintain a pressure in chamber 26. In order that this pressure may exceed that of the gas within the transmission line, tank 21 is connected by means of conduit 24 to an opening in the outer conductor 1 of the upper section of the transmission line. The tank 21 may have an opening in its upper portion, to be closed by plug 25, for furnishing oil to this tank. Of course, while I have shown the tank 21 as secured to the upper conductor 1, it need not necessarily be so secured but may be spaced with respect to this conductor. However, it is necessary that the level of the oil 23 within the tank 21 be maintained at an elevation higher than that of the chamber 26. In such a structure conduit 24 would be extended to join the upper portion of tank 21 with the outer conductor 1. Of course, the point of entry of this conduit 24 in the tank 21 must be above that of the oil level 23. In Fig. 2 I have likewise shown the "chevrons" of the upper sections of the packing glands 18 in a direction opposite to that in Fig. 1. This is done to prevent the leakage of oil or other fluid through this packing gland into the transmission line.

By the structure shown in Fig. 2, I have provided a system for sealing the junction between relatively rotatable sections of a vertical concentric transmission line which will not only provide a better seal to prevent more effectively the escape of gas from the transmission line but also increase the life of the packing glands due to the fact that oil or a similar material used to lubricate the packing and to maintain it in good condition is always present. In this structure the tranmission line may be filled, for example, with nitrogen, to a pressure of about 15 lb. per square inch. Regardless of the gas pressure, however, there will always be maintained a differential pressure at the sealing point, produced by the head of the oil column in the tank 21 and the conduit 22 and tending to keep the gas in the line. Used in conjunction with the spring 20 and the spring retainers 19, this oil column will prevent the escape of gas from the line, and the packing glands under spring pressure will prevent the leakage of the oil into the transmission line.

In Fig. 3 I have shown a modification of the structure shown in Fig. 2 in which a horizontal line is coupled to a rotating section. In this modification the concentric conductors 1 and 2 are fixed and conductors 3 and 4 are rotatable with respect to them. Tank 21 is located above sleeve 13 and conduit 24 connects the space above the oil in the tank with the space within outer conductor 1. In all other respects the structure is quite similar to that shown in Fig. 2.

While I have shown particular embodiments of my invention, it will of course be understood that I do not wish to be limited thereto since various modifications may be made, and I contemplate by the appended claims to cover any such modifications as fall within the true spirit and scope of my invention.

What I claim as new and desire to secure by Letters Patent of the United States, is:

1. In a gas-filled high frequency transmission line having spaced inner and outer conductors, the combination of a fixed section of said line and a rotating section adjacent thereto, and means for maintaining electrical conductivity between said sections and for preventing the escape of gas from said line, said means comprising, a contact making member secured to one of said inner conductors and rotatably engaging the other of said inner conductors, a sleeve attached to one of said outer conductors and surrounding a portion of the other of said outer conductors, a plurality of bearing surfaces on said other outer conductor cooperating with the internal surface of said sleeve to facilitate rotation between said sections, packing material surrounding said other outer conductor between said bearing surfaces, and resilient means for maintaining said packing material in engagement with both said sleeve and said other outer conductor in the vicinity of said bearing surfaces, whereby the leakage of gas from said transmission line is prevented.

2. In a gas-filled high frequency transmission line having spaced inner and outer conductors, the combination of a fixed section of said line and a rotating section adjacent thereto, and means for maintaining electrical conductivity between said sections and for preventing the escape of gas from said line, said means comprising, a contact making member secured to one of said inner conductors and rotatably engaging the other of said inner conductors, a sleeve attached to one of said outer conductors and surrounding a portion of the other of said outer conductors, a plurality of bearing surfaces on said other outer conductor cooperating with the internal surface of said sleeve to facilitate rotation between said sections, packing material surrounding said other outer conductor between said bearing surfaces, and means for maintaining the space between said bearing surfaces at a pressure greater than that within said transmission line, whereby the leakage of gas from said line is prevented.

3. In a gas-filled high frequency transmission line having spaced inner and outer conductors, the combination of a fixed section of said line, a continuously rotating section adjacent thereto, a sleeve attached to one of said sections and surrounding a portion of the other of said sections, a plurality of bearing surfaces on said other section cooperating with the internal surface of said sleeve to facilitate rotation between said sections, packing material surrounding said other section between said bearing surfaces, and means for maintaining the space between said bearing surfaces at a pressure greater than that within said transmission line, said means comprising a fluid containing receptacle relatively fixed with respect to the one of said sections, conduit means connecting said receptacle to said sleeve at a point between said bearing surfaces, and means for maintaining the fluid in said conduit at a pressure greater than that of the gas within said transmission line.

4. A seal for the junction between fixed and rotatable sections in a gas-filled high frequency concentric transmission line comprising, a sleeve forming part of one of said sections of said transmission line and enveloping a portion of the other of said sections of said transmission line, a plurality of cooperating bearing surfaces on both said sleeve and said other section, packing glands in resiliently biased engagement with said sleeve and said one section in the vicinity of said bearing surfaces, and means for maintaining the space between said sleeve and said other section at a pressure greater than the gas pressure within said transmission line whereby leakage of gas from said transmission line is prevented.

5. A seal for the junction between fixed and rotatable sections of a gas-filled high frequency concentric transmission line comprising, a sleeve forming part of one of said sections of said transmission line and surrounding a portion of the other of said sections of said transmission line, a plurality of cooperating bearing surfaces on both said sleeve and said other section, packing glands in resiliently biased engagement with said sleeve and said one section in the vicinity of said bearing surfaces, a receptacle fixed with respect to said one of said sections and connected with the space between said sleeve and said one section, a fluid within said receptacle having a level higher than said space, and a second connection between the gas within said one section and said receptacle at a point above said fluid level.

6. An arrangement for sealing the junction between relatively rotatable sections of a gas-filled concentric transmission line comprising, a sleeve formed with one of said sections of said transmission line and enveloping a portion of the other of said sections of said transmission line, opposed faces within said sleeve forming an annular space about said other section, packing material within said annular space engaging both said opposed faces and said other section, resilient means for compressing said packing material to assist in forming a tight seal between said sleeve and said other section, and means for maintaining said annular space at a pressure greater than the gas pressure within said transmission line, whereby leakage of gas from said transmission line is prevented.

7. The combination in a vertical gas-filled transmission line having spaced inner and outer conductors, of a lower section of said transmission line, an upper section rotating continuously with respect to said lower section, a sleeve formed with said upper section and surrounding a portion of said lower section, cooperating bearing surfaces on said sleeve and said lower section, a packing member within said sleeve, resilient means for insuring engagement of said packing member with both said sleeve and said lower section, a fluid containing receptacle attached to said upper section, conduit means for conveying fluid from said receptacle to said sleeve, and conduit means connecting the upper portion of said receptacle with the gas in said upper section, whereby the space within said sleeve is maintained at a pressure greater than the gas pressure of said line to prevent leakage of gas from said transmission line.

8. The combination in a vertical gas-filled transmission line having spaced inner and outer conductors, of a lower section of said transmission line, an upper section rotatable with respect to said lower section, a sleeve formed with said upper section and surrounding a portion of said lower section, a contact making member attached to the inner conductor of one of said sections and rotatably contacting the inner conductor of the other of said sections and contact means on the outer conductor of said lower section cooperating with said sleeve to provide electrical conduction during periods of relative movement between said sections, cooperating bearing surfaces on said sleeve and said lower section, a packing member within said sleeve, resilient means for insuring engagement of said packing member with both said sleeve and said lower section, a fluid containing receptacle attached to said upper section, conduit means for conveying fluid from said receptacle to said sleeve, and conduit means connecting the upper portion of said receptacle with the gas in said upper section, whereby the space within said sleeve is maintained at a pressure greater than the gas pressure of said line to prevent leakage of gas from said transmission line.

ARTHUR J. VAN ALSTYNE.